United States Patent [19]

Reinhardt et al.

[11] 4,032,240

[45] June 28, 1977

[54] TELESCOPIC DEVICE

[75] Inventors: Horst Reinhardt, Weiskirchen; Ernst Höger, Grosswelzheim, both of Germany

[73] Assignee: Kraftwerk Union Aktiengesellschaft, Mulheim (Ruhr), Germany

[22] Filed: Mar. 5, 1976

[21] Appl. No.: 664,401

[30] Foreign Application Priority Data

Mar. 7, 1975 Germany .................... 2510062

[52] U.S. Cl. .................... 403/108; 403/322
[51] Int. Cl.² .................... F16B 7/10
[58] Field of Search .......... 403/108, 106, 109, 316, 403/321, 322; 248/407, 188.5, 408

[56] References Cited

UNITED STATES PATENTS 2,719,688 10/1955 Seifert .................... 403/106 X
3,107,109 10/1963 Tindale .................... 403/321

FOREIGN PATENTS OR APPLICATIONS 2,035,950 2/1972 Germany .................... 248/407

*Primary Examiner*—Andrew V. Kundrat
*Attorney, Agent, or Firm*—Herbert L. Lerner

[57] ABSTRACT

Telescopic device includes a plurality of elongated members disposed one within the other in a fully telescoping condition thereof and including an innermost member, an outermost member and at least one member intermediate thereto, the members being displaceable in longitudinal direction relative to one another in a predetermined sequence, stop means for limiting travel of the members relative to one another, the at least one intermediate member being formed at a wall region located at one end thereof with a recess penetrating therethrough, a locking member disposed in the recess and having a dimension greater than the thickness of the wall region, one of the innermost and outermost members being formed with a depression at the end thereof located, in the fully telescoping position of the members, adjacent the other end of the elongated intermediate member, the locking member, in an extended condition of the intermediate member with respect to the one of the innermost and outermost members, being partly receivable in the depression, a projection extending from the other of the innermost and outermost members, at an end thereof located adjacent to the one end of the intermediate member in the fully telescoping position of the members, the projection partly surrounding the locking member, and blocking means associated with the locking member at one side of the projection, the blocking means being engageable with the locking members for holding the same in a blocked position located at one side of the wall region of the intermediate member.

7 Claims, 4 Drawing Figures

TELESCOPIC DEVICE

The invention relates to a telescopic device, especially for nuclear reactor plants, having at least three elongated members preferably in the form of tubes, which are encased one within the other, and which are displaceable in longitudinal direction relative to one another in a predetermined sequence over a distance limited by stops.

Such telescopic devices are installed, for example, for transporting nuclear fuel elements, and also for monitoring or inspecting purposes in nuclear energy plants or installations. They must operate with extraordinary reliability because, with their aid, great distances, which are provided for reasons of protection against radiation, for example in the form of water columns as shielding, are to be bridged. In such shielding, virtually no repairs are possible during a disturbance or disruption. On the other hand, such long telescopic devices are susceptible to trouble due to friction and the danger of the jamming or locking of the telescoping members. It is therefore especially important that the telescopic device achieve an accurate course of movement through a positive or forced sequence of relative displacements of the individual telescoping members.

It is accordingly an object of the invention to provide a telescopic device of the foregoing general type which avoids the heretofore encountered disadvantages noted above and which has an accurate course of movement effected through a positive sequence of relative displacements of the individual telescoping members.

SUMMARY OF THE INVENTION

With the foregoing and other objects in views, there is provided, in accordance with the invention, a telescopic device comprising a plurality of elongated members disposed one within the other in a fully telescoping condition thereof and including an innermost member, an outermost member and at least one member intermediate thereto, the members being displaceable in longitudinal direction relative to one another in a predetermined sequence, stop means for limiting travel for the members relative to one another, the at least one intermediate member being formed at a wall region loacted at one end thereof with a recess penetrating therethrough, a locking member disposed in the recess and having a dimension greater than the thickness of the wall region, one of the innermost and outermost members being formed with a depression at the end thereof located, in the fully telescoping position of the members, adjacent the other end of the elongated intermediate member, the locking member, in an extended condition of the intermediate member with respect to the one of the innermost and outermost members, being partly receivable in the depression, a projection extending from the other of the innermost and outermost members, at an end thereof located adjacent to the one end of the intermediate member in the fully telescoping position of the members the projection partly surrounding the locking member, and blocking means associated with the locking member at one side of the projection, the blocking means being engageable with the locking member for holding the same in a blocked position located at one side of the wall region of the intermediate member.

In accordance with another feature of the invention, the telescopic device includes a plurality of locking members distributed about the periphery of the telescoping members in a plane transverse to the longitudinal direction thereof.

In accordance with a further feature of the invention, the locking member has a dimension at least about 30 percent greater than the thickness of the wall region.

In accordance with an additional feature of the invention, the innermost, outermost and intermediate members are formed of an axially symmetrical assmebly of cylindrical tubes encased one within the other.

In accordance with an added feature of the invention, the telescopic device includes guide means for preventing relative rotation of the tubes; the locking member, the recess and the depression being alignable in a given extended condition of the tubes.

In accordance with a concomitant feature of the invention, the depression is a bore having a smaller diameter than that of the recess.

A compelling effect of the locking members is that always only one of the telescoping members is able to carry out relative displacement with respect to the others and, through accurate disposition of the depressions, projections and blocking means, provision is made that the one telescoping member is the next in the sequence or succession.

Other features which are considered as characteristic for the invention are set forth in the appended claims.

Although the invention is illustrated and described herein as embodied in telescopic device, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawing, in which.

DESCRIPTION OF THE PREFERRED EMBODIMENTS

Figure 1:
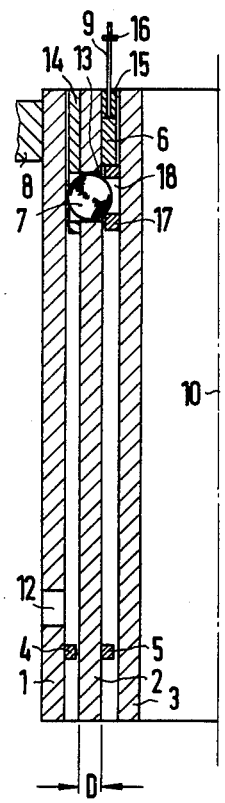
FIGS. 1 to 4 are half-sectional views of an embodiment of the telescopic device of the invention shown in four succeeding telescoping positions thereof.

Referring now to the drawing and first particularly to FIG. 1 thereof, there is shown diagrammatically the telescopic device of the invention which includes three cylindrical tubes 1, 2 and 3 encased one within the other and having a common axis respresented by a dot-dash line 10. The illustrated telescopic device may, for example, form part of a nuclear fuel element loading machine having a range of 10 meters. Therefore, the outermost tube 1 is fastened with a flange 8 to a traveling positioning device of the fuel element loading device, which is not further illustrated. The innermost tube 3 carries a gripper, which can be mounted on the inner side thereof, but which, just as the driving devices associated therewith is non-illustrated.

The tube 1 is provided, at the end thereof facing away from the non-illustrated loading machine or in other words, at the end thereof opposite to the end at which the flange 8 is located, with the bore 12 as well as a stop 4. Although only one bore 12 is shown, a repeated number thereof may be provided in a plane transverse to the longitudinal direction of the telescopic device of the invention i.e. transverse to the axis 10. The stop 4 is formed as a ring extending around the entire periphery of the tube 1 at the inner side thereof.

The tube 2 disposed between the innermost tube 3 and the outermost tube 1 is formed, at the end thereof facing toward the non-illustrated loading machine i.e. at the end thereof closer to the flange 8 mounted on the outermost tube 1, with a cylindrical bore 13 extending through the entire wall of the tube 2. A ball 7 serving as a locking member is disposed in the bore 13. As shown clearly in FIG. 1 as well as in the other figures of the drawing, the diameter of the ball 7 is considerably greater than the thickness D of the wall of the tube 2. The diameter of the ball 7, in the illustrated embodiment of the invention, is substantially twice as large as the thickness D of the tube wall 2.

The bore 13 continues on i.e., also passes through, the outer ring 14 connected to the tube 2 and extending just slightly beyond the bore 13 from the end of the tube 2 which faces toward the non-illustrated loading machine at the top of FIG. 1, for example. The outer ring 14 is as thick as the ring 4 which serves as a stop.

A ring 15, into which a holding rod 9 extends, is secured to the inner side of the tube 2 at the upper end thereof as viewed in FIG. 1, for example. The holding rod 9 is provided with a stop 16 which limits the movement of a ring-shaped blocking member 6, into which the holding rod 9 is inserted on the other side of the ring 15, relative to the ring 15. At the other end of the tube 2, a ring-shaped stop 5 corresponding to the stop 4 is connected to the tube 2 at the inner side thereof.

The inner tube 3 is provided at the outer side thereof with a projection 17 which surrounds the ball 7 in the position of the telescopic device of the invention shown in FIG. 1 The projection 17 can be a ring-shaped member which in view of the curvature of the tube 3, is a spatially defomed structure. However, a ring extending around the tube 3 wherein bores 18 corresponding to the bores 13 but having a smaller diameter than that of the latter are formed can also be used as the projection 17.

In FIG. 1, the telescopic device of the invention is shown in the fully telescoped condition thereof. The three tubes 1, 2 and 3 are fully encased within one another. In this condition shown in FIG. 1, the telescopic device is at its shortest length.

Figure 2:
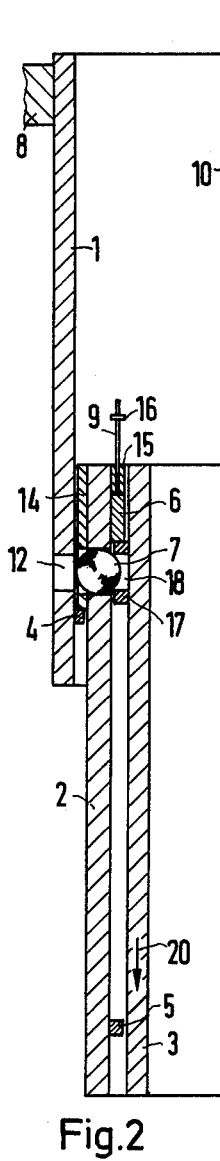

To extend the telescopic device of the invention, a force directed away from the positioning device is rendered effective through a non-illustrated drive, for example, in that the force of gravity will give way in direction of the axis 10 through loosening of a cable secured to the tube 3. In such a case, as shown in FIG. 2, the tubes 2 and 3 are initially displaced together relative to the tube 1. The displacement in common of the tubes 2 and 3 is forcibly assured due to the fact that the ball 7 as a locking member extends into the bore 18 of the projection 17 which partly surrounds the ball 18.

Figure 3:
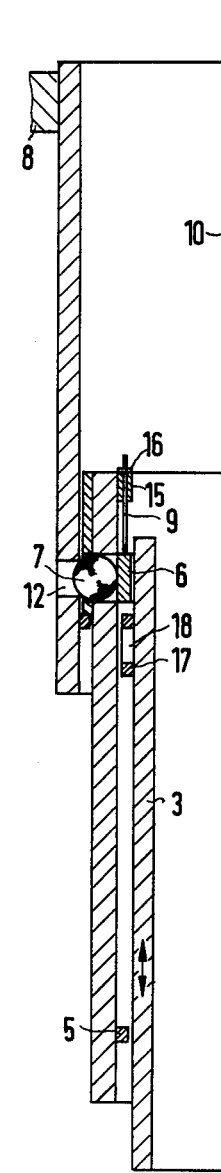

The locking is effective unitl the tube 2 with the underside of the ring 14, as viewed in FIG. 2, runs up against the stop 4. In the latter position, the ball 7 has reached the bore 12 formed in the tube 1. Therefore, the ball 7 can be pressed into the bore 12, as shown in FIG. 3, through the action of the tube 3 which travels farther downwardly, in direction of the arrow 20 relatively to the tube 2. The depth of penetration of the ball 7 into the bore 13 is given by the difference between the diameter of the ball 7 and the smaller diameter of the bore 12.

After the ball 7 has been inserted into the bore 12, the ball 7 is firmly retained by the blocking member 6, as shown in FIG. 3. The tube 3 permits itself then to be displaced downwardly, as viewed in FIG. 3, toward the stop 5 i.e., so far that the ring 17 abuts the stop 5, which is not actually illustrated in the figures. Independently thereof, the blocking member 6 maintains its position which is determined or fixed by the holding rod 9.

Figure 4:
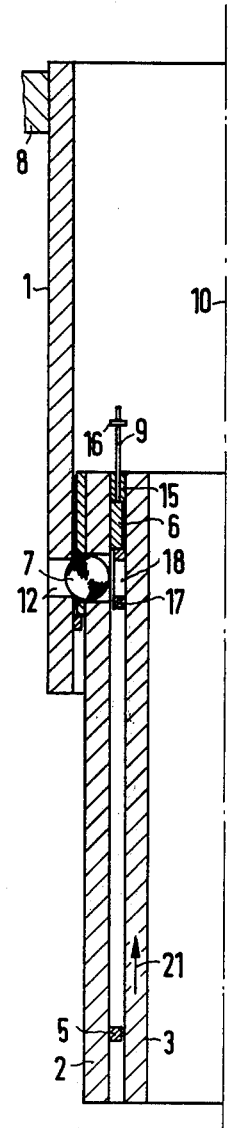

If the telescopic device of the invention is again collapsed or telescoped completely as indicated by the arrow 21 in FIG. 4, after having been extended, the ring 17 thus reaches the blocking member 6 and raises the latter against the ring 15. As further shown in FIG. 4, a displacement of the ball 7 into the tube 2 is thereby possible. This displacement is effected by the ball 7 when the upward displacement is continued, because the edge defining the bore 12 thereby exerts an inwardly directed force on the ball 7 due to the sphericity or roundness of the latter. The tubes 2 and 3 are thereafter forcibly driven upwardly together because the ball 7 partly engages in the depression or bore 18. Force transmission occurs from the tube 3 through the ring 17, the blocking member 6 and the ring 15 to the tube 2. The final position then becomes the same position as that illustrated in FIG. 1.

It is believed to be quite clear that, within the scope of the invention, the relatively simplified embodiment of the invention can actually be provided with any desired number of tubes located between the innermost tube 3 and the outermost tube 1 without jeopardizing the required sequence of displacement that are ensured by relatively simple means. The tubes need also not have any special form. For example, a desired non-rotatability of the tubes, which ensures alignment between the bores 12, 13 and 18 that is necessary for operation of the telescopic device, is attainable by the use of tubes with a non-rotationally symmetrical cross section, for example a rectangular or square cross section. If, for other reasons, rotatability of the tubes must be taken into consideration, encircling grooves, which ensure operation even during rotation of the tubes, can be used instead of the bores 12 and 13. Moreover, the invention of the instant application is suitable not only for telescopic devices formed of members that are tubes having closed i.e. solid, walls, but rather also for telescopic devices formed of members consisting, for example, of a network or screening, just so along as mutual encasing of those members is possible.

In addition to balls, other roller members which afford an adequately easy displaceability are suitable as locking members.

The number of the locking members that are used depend upon the forces to be absorbed and the permissible pressure per unit as well as upon the diameter of the mutually encased members. In order to avoid canting or twisting, at least three locking members should lie in a plane perpendicular to the axis 10.

There is claimed:

1. Telescopic device comprising a plurality of elongated members disposed one within the other in a fully telescoping retracted condition thereof and including an innermost member, an outermost member and at least one member intermediate thereto, said members being displaceable in longitudinal direction relative to one another in a predetermined sequence, stop means for limiting travel of said members relative to one another, said at least one intermediate member being formed at a wall region located at one end thereof with a recess penetrating therethrough, a locking member disposed in said recess and having a dimension greater than the thickness of said wall region, one of said innermost and outermost members being formed with a depression at the end thereof located, in said fully telescoping retracted position of said members, adjacent the other end of said elongated intermediate members, said locking member, in a extended condition of said intermediate member with respect to said one of said innermost and outermost members, being partly receivable in said depression, a projection extending from the other of said innermost and outermost members, at an end thereof located adjacent to said one end of said intermediate member in said fully telescoping retracted position of said members, said projection at least partly surrounding said locking member, and blocking means located at one side of said projection, and being engageable with said locking member for holding the same in a blocked position located at one side of said wall region of said intermediate member.

2. Telescopic device according to claim 1 including a plurality of locking members distributed about the periphery of said telescoping members in a plane transverse to the longitudinal direction thereof.

3. Telescopic device according to claim 1 wherein said locking member has a dimension at least about 30 percent greater than the thickness of said wall region.

4. Telescopic device according to claim 1 wherein said innermost, outermost and intermediate members are formed of an axially symmetrical assembly of cylindrical tubes encased one within the other.

5. Telescopic device according to claim 1 including guide means for preventing relative rotation of said tubes and said locking member, said recess and said depression being alignable in a given extended condition of said tubes.

6. Telescopic device according to claim 1 wherein said depression is a bore having a smaller diameter than that of said recess.

7. Telescopic device according to claim 1 wherein said locking member is a ball.

* * * * *